(No Model.)
J. BURKHART.
SAW SET.
No. 248,997.　　　　　　　　Patented Nov. 1, 1881.
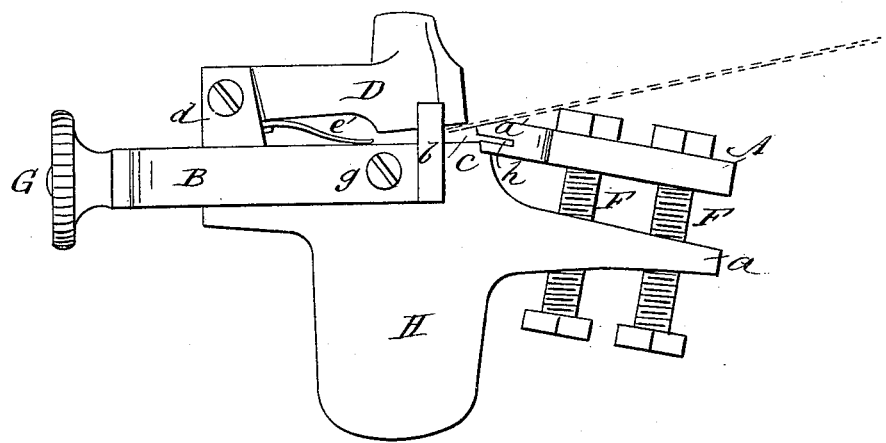
WITNESSES:
C. Neveux
T. Sedgwick
INVENTOR:
J. Burkhart
BY Munn & Co.
ATTORNEYS.

UNITED STATES PATENT OFFICE.

JACOB BURKHART, OF LOCK HAVEN, PENNSYLVANIA.

SAW-SET.

SPECIFICATION forming part of Letters Patent No. 248,997, dated November 1, 1881.

Application filed July 20, 1881. (No model.)

*To all whom it may concern:*

Be it known that I, JACOB BURKHART, of Lock Haven, in the county of Clinton, in the State of Pennsylvania, have invented a new and Improved Saw-Set, of which the following is a full, clear, and exact description.

The object of my invention is the production of an improved implement by which the teeth of fine as well as coarse saws may be accurately set, and one which is adapted also to hold and set the teeth of narrow scroll-saws.

The invention consists, principally, of an adjustable and slotted rest or support for the saw, of a horizontally-adjustable stop or guide, of the said horizontally-adjustable stop or guide in combination with a spring-supported hammer, and, also, of the construction and arrangement of the parts of the device, as hereinafter more particularly set forth and claimed.

In the accompanying drawings, Figure 1 is a side elevation of my improved saw-set. Fig. 2 is a plan view of the same. Fig. 3 is a central longitudinal section taken on the line $x\ x$ of Fig. 2, and Fig. 4 is a transeverse section taken on the line $y\ y$ of Fig. 3.

Similar letters of reference indicate corresponding parts.

A represents the rest or support for the saw. B represents the sliding stop or guide for the saw-teeth, and D represents the hammer, which is adapted to be struck down upon the saw-teeth for setting the same.

The forward end of the hammer is triangular in form or pointed, as shown in Fig. 2, and is hinged between the perforated lugs or upward extensions $d\ d$, and is supported nominally a short distance above the anvil-face $c$ by the small flat spring $e'$, which is secured to its under side.

The sliding stop or guide is U-shaped and is placed upon the anvil H, and is adjustable in line with the face of the anvil by means of the screw-bolt G, which passes through the rear end or bend of the guide and enters the screw-tap $f$, formed in the anvil. The forward part of the guide is supported in position by the screw or bolt $g$, which moves in the through-slot $e$ of the anvil. The front faces, $b\ b$, of the guide or stop, against which the teeth of the saw are held, extend a short distance above the face of the anvil, and the head of the hammer is of such size relative to the distance between the faces $b\ b$ that they act as lateral guides to the hammer and cause it to come down on each tooth squarely.

The support or rest A for the saw is preferably of the outline shown in Fig. 2, and is held in place upon the shouldered and double-threaded screw-bolts F F, which pass through the extension $a$ of the anvil and the elongated opening $j$ of support A. The upper and forward edge of the support is beveled, as shown, and formed with the cut-away place $a''$ in the center, and the extended portions $a'\ a'$, formed by the cut-away part, are provided with the cross-slots $h$ for holding narrow or scroll saws.

In use the support A is to be brought to the proper elevation by turning the screws F F, and to the proper proximity to the nose of the hammer, and secured there upon the shoulders $f'\ f'$ of said screws, which position of the support may be varied according to the size of the teeth of the saw and the degree of set desired. The stop or guide B is then to be adjusted according to the length of the teeth of the saw, so that when the saw is placed upon the support or rest, as shown in dotted lines in Fig. 1, and the teeth held and moved against the faces $b\ b$ of the guide, the hammer will strike each tooth the same distance from the point and in the proper place, and cause them to have a regular set throughout the length of the saw. In setting the teeth of narrow or scroll saws the back of the saw is to be placed in the slots $h$ of the support A, which must now be adjusted to a proper position to bring the teeth the proper distance under the hammer, and when used for this purpose, if the back of the saw is straight, the guide B may or may not be used, as desired, as the backs of the slots $h$ serve also as a good guide for the movement of the saw over the anvil.

Having thus described my invention, I claim as new and desire to secure by Letters Patent—

1. In a saw-set, the combination of the hammer D, guide B, having faces $b\ b$ and stop $g$, anvil H, having extension $a$, and the rest or support A, provided with the slot $h$ and beveled faces $a'$ $a'$, having opening $a''$ therein, the opening $j$, and bolts F F, substantially as shown and described.

2. In a saw-set, the combination, with the anvil H, having extension $a$, of the rest or support A, provided with the slot $h$ and beveled faces $a'$ $a'$, having opening $a''$ therein, the opening $j$, and bolts F F, whereby the said rest is adaptable to saws of all widths, substantially as shown and described.

JACOB BURKHART.

Witnesses:
WILLIAM ALLISON WHITE,
WINFIELD SCOTT CLAWATER.